United States Patent Office 3,475,452
Patented Oct. 28, 1969

3,475,452
PHOSPHATES AND PHOSPHONATES OF CYCLIC SULFONES
Peter E. Newallis, Morris Plains, and Langley A. Spurlock, Montclair, N.J., assignors to Allied Chemical Corporation, New York, N.Y., a corporation of New York
No Drawing. Filed Feb. 8, 1966, Ser. No. 525,847
Int. Cl. C07d 63/00; A01n 9/36
U.S. Cl. 260—332.1
7 Claims

ABSTRACT OF THE DISCLOSURE

Novel cyclic sulfone phosphates and phosphonates of the formula $$\begin{array}{c} R_1O \\ \diagdown \\ R_2 \diagup \end{array} \overset{Y}{\underset{\|}{P}} - S - CH_2 - Q$$

wherein Q is a cyclic sulfone radical which can have the formula

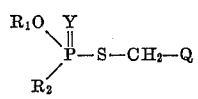

Y is oxygen or sulfur, $R_1$ is alkyl and $R_2$ is alkyl or alkoxy. These compounds are prepared by reaction of an appropriate alkylalkoxy- or dialkoxy-phosphorothioate salt and a halomethyl-substituted cyclic sulfone. These compounds are useful as pesticides.

This invention relates to the production of novel cyclic sulfone phosphate and phosphonate pesticidal toxicants.

Accordingly, the object of the invention is to provide new chemical compounds in the form of cyclic sulfone phosphates and phosphonates. Another object is to provide processes for the production of the novel cyclic sulfone phosphate and phosphonate compounds. A further object is the provision of novel cyclic sulfone phosphate and phosphonate compounds as compositions for application as pesticides.

Novel cyclic sulfone phosphate and phosphonate compounds of the present invention are characterized by the structural formula:

$$\begin{array}{c} R_1O \\ \diagdown \\ R_2 \diagup \end{array} \overset{Y}{\underset{\|}{P}} - S - CH_2 - Q$$

wherein Q is a cyclic sulfone radical selected from the class consisting of

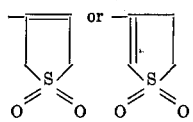

radicals,
Y is a chalcogen selected from the group consisting of oxygen and sulfur, $R_1$ is an alkyl radical and $R_2$ is a member selected from the group consisting of alkyl and alkoxy radicals.

In the above formula, $R_1$ is preferably a lower alkyl radical containing from one to six carbon atoms and $R_2$ is preferably a member selected from the group consisting of lower alkyl radicals and lower alkoxy radicals containing from one to six carbon atoms. Illustrative alkyl and alkoxy groups representative of $R_1$ and $R_2$ comprise methyl, methoxy, ethyl, ethoxy, propyl, propoxy, butyl, butoxy, pentyl, pentoxy, hexyl, hexoxy, as well as various isomeric forms thereof.

The cyclic sulfone phosphate and phosphonate compounds of this invention may be prepared by reaction of an alkylalkoxy- or a dialkoxy-phosphorothioate compound corresponding to the general formula:

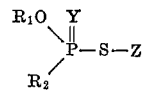

wherein Z is ammonium, an alkali metal such as sodium or potassium or an alkaline-earth metal such as barium or calcium, and $R_1$, $R_2$ and Y have the afore-stated meanings with a halomethyl substituted cyclic sulfone compound conforming to the formula:

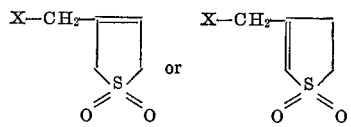

wherein X is a halogen such as chlorine or bromine. The representative reaction of 3-bromomethyl-2,5-dihydrothiophene-1,1-dioxide with ammonium O,O-diethyl phosphorodithioate may be illustrated as follows:

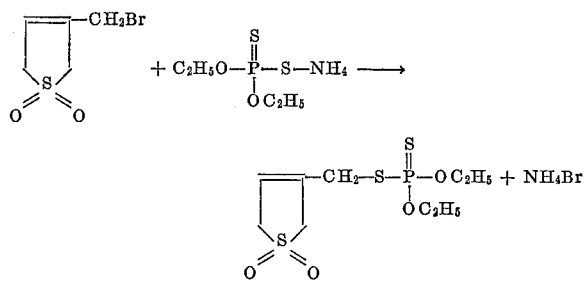

In the above process, the alkylalkoxy- or dialkoxy-phosphorothioate compound may be used as is or, alternatively, may be prepared in situ by reaction of alkylalkoxy- or dialkoxy-thiophcsphoric acid with a basic ammonium, alkali metal or alkaline-earth metal forming compound having sufficient alkalinity to neutralize said acid such as ammonium, alkali metal or alkaline-earth metal carbonates, hydroxides, borates, phosphates, and pyrophosphates.

The halomethyl substituted cyclic sulfone compounds may be prepared by reaction of 3-methyl-2,5-dihydrothiophene-1,1-dioxide or 4-methyl-2,3-dihydrothiophene-1,1-dioxide with a N-halosuccinimide such as N-bromosuccinimide or N-chlorosuccinimide as described, for example, by Krug et al., in Journal of Organic Chemistry, vol. 21, pages 1082–6 (1956).

The cyclic sulfone phosphate and phosphonate compounds of the invention may be prepared by adding the above described alkylalkoxy- or dialkoxy-phosphorothioate compound to the halomethyl substituted cyclic sulfone compound with stirring in the presence of an inert organic solvent for one or both of the reactants at a temperature of about 0° C. to 100° C., preferably 20° C. to 30° C. Alternatively, the halomethyl substituted cyclic sulfone compound may be added to the alkylalkoxy- or dialkoxy-phosphorothioate compound. After the reactants are mixed, the reaction mixture is preferably held for about 12 to 24 hours at a temperature of about 20° C. to 30° C. Ammonium, alkali metal or alkaline-earth metal halide, formed during the reaction, may be removed by any conventional procedure, preferably by filtration, and the solvent may be removed by simple distillation at atmospheric or subatmospheric pressure. The cyclic sulfone phosphate or phosphonate product, recovered as the distilland, may be further purified as by distillation.

The inert organic solvent employable herein is preferably one boiling lower than the cyclic sulfone phosphate or phosphonate product. Suitable organic solvents include aliphatic alcohols such as methanol and ethanol; ketones such as acetone and diethylketone; ethers such as dioxane, diethylether, and di-n-propylether; aromatic hydrocarbons such as benzene, toluene, and xylene; and halogenated hydrocarbons such as methylene chloride, chloroform and carbon tetrachloride.

Although the alkylalkoxy- or dialkoxy-phosphorothioate may be charged in molar proportions of one mole of halomethyl substituted cyclic sulfone to about 1.1 to 10 moles of alkylalkoxy- or dialkoxy-phosphorothioate, approximately equimolar proportions of the reactants are preferred.

The following examples are given for the purpose of illustrating the present invention but are not intended to be limiting on the scope thereof. In the examples, parts are by weight.

Example 1

10 parts of 3-bromomethyl-2,5-dihydrothiophene-1,1-dioxide were dissolved in 39.6 parts of acetone and the resulting solution was placed in a reaction vessel provided with a mechanical stirrer. 12 parts of ammonium O,O-diethyl phosphorodithioate dissolved in 55.4 parts of acetone rapidly were added to the reaction vessel with stirring at room temperature. Stirring of the reaction mixture at room temperature was continued for a period of about 18 hours. Approximately 4.5 parts of ammonium bromide formed as a by-product of the reaction were filtered off and the filtrate was stripped of solvent at subatmospheric pressure to yield an oil which was dissolved in methylene chloride and washed twice with water. The organic extract was dried over magnesium sulfate and stripped in vacuo. A yield of 12.4 parts (theory, 14.9 parts) of 3-(diethoxy-phosphinothioylthio) methyl-2,5-dihydrothiophene-1,1-dioxide, a viscous brown oil, having the following structural formula was obtained:

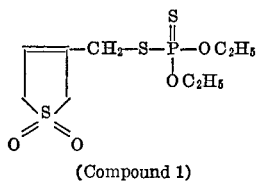

(Compound 1)

This compound was found to contain 9.2% phosphorus (theory, 9.7%) and 29.9% sulfur (theory, 30.4%). The compound was soluble in acetone, diethyl ether, benzene and chloroform and insoluble in water. Infrared analysis of the compound showed the presence of the sulfone group (7.58 microns) and the P—O—alkyl group (9.90 microns).

Example 2

3 parts of 3-bromomethyl-2,5-dihydrothiophene-1,1-dioxide were reacted with 3 parts of ammonium O,O-dimethyl-phosphorodithioate using the procedure described in Example 1. 3.5 parts of 3-(dimethoxyphosphinothioylthio) methyl-2,5-dihydrothiophene-1,1-dioxide, an amber oil, having the following structural formula were obtained:

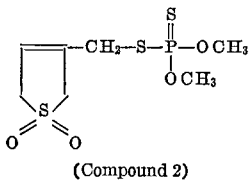

(Compound 2)

This compound was found to contain 10.7% phosphorus (theory, 10.8%) and 33.5% sulfur (theory, 33.4%). The compound was soluble in acetone, diethyl ether and benzene and insoluble in water. Infrared analysis of the compound showed the presence of the sulfone group (7.63 microns) and the P—O—alkyl group (9.90 microns).

Example 3

3 parts of 3-bromomethyl-2,5-dihydrothiophene-1,1-dioxide were reacted with 3 parts of ammonium O,O-diethyl phosphorothioate using the procedure described in Example 1. 3.8 parts of 3-(diethoxyphosphinylthio) methyl-2,5-dihydrothiophene-1,1-dioxide, an amber oil, having the following structural formula were obtained:

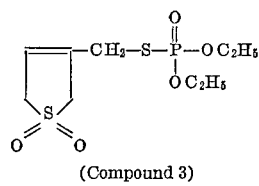

(Compound 3)

This compound was found to contain 10.7% phosphorus (theory, 10.3%) and 21.0% sulfur (theory, 21.4%). The compound was soluble in acetone, diethyl ether and benzene and insoluble in water. Infrared analysis of the compound showed the presence of the sulfone group (7.62 microns) and the P—O—alkyl group (9.85 microns).

Example 4

3 parts of 3-bromomethyl-2,5-dihydrothiophene-1,1-dioxide were reacted with 3 parts of ammonium O-ethyl methyl-phosphorodithioate using the procedure described in Example 1. 3.6 parts of 3-(ethoxymethylphosphinothioylthio) methyl-2,5-dihydrothiophene-1,1 - dioxide, an amber oil, having the following structural formula were obtained:

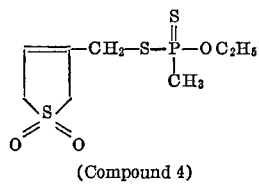

(Compound 4)

This compound was found to contain 11.1% phosphorus (theory, 10.8%) and 34.1% sulfur (theory, 33.6%). The compound was soluble in acetone, diethyl ether and benzene and insoluble in water. Infrared analysis of the compound showed the presence of the sulfone group (7.61 microns) and the P—O—alkyl group (9.73 microns).

Example 5

Employing the procedure of Example 1 but replacing 3-bromomethyl-2,5-dihydrothiophene - 1,1 - dioxide with an equimolar amount of 4-bromomethyl-2,3-dihydrothiophene-1,1-dioxide there is obtained 4-(diethoxyphosphinothioylthio) methyl-2,3 - dihydrothiophene-1,1-dioxide, a viscous oil, having the structural formula:

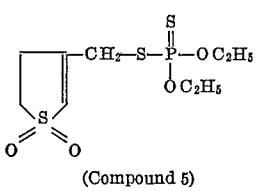

(Compound 5)

which is soluble in acetone, diethyl ether and benzene but insoluble in water.

Example 6

Employing the procedure of Example 1 but using equimolar amounts of 4-bromomethyl-2,3-dihydrothiophene-1,1-dioxide and ammonium O-ethyl methylphosphorothioate there is obtained 4 - (ethoxymethylphosphinylthio) methyl - 2,3-dihydrothiophene-1,1-dioxide, a viscous oil, having the structural formula:

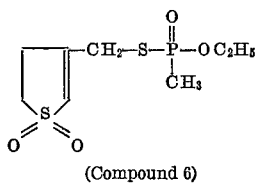

(Compound 6)

which is soluble in acetone, diethyl ether and benzene but insoluble in water.

In a manner analogous to that described in the above examples, other compounds illustrative of the present invention may be prepared as follows:

3-(diisopropoxyphosphinothioylthio) methyl-2,5-dihydrothiophene-1,1-dioxide by reaction of 3-bromomethyl-2,5-dihydrothiophene-1,1-dioxide and ammonium O,O-diisopropyl phosphorodithioate.

3-(diisopropoxyphosphinylthio) methyl - 2,5 - dihydrothiophene-1,1-dioxide by reaction of 3-bromomethyl-2,5-dihydrothiophene-1,1-dioxide and ammonium O,O-diisopropyl phosphorothioate.

4-(ethylethoxyphosphinothioylthio) methyl - 2,3 - dihydrothiophene-1,1-dioxide by reaction of 4-bromomethyl-2,3-dihydrothiophene-1,1-dioxide and ammonium O-ethyl ethylphosphorodithioate.

4-(diisopropoxyphosphinothioylthio) methyl-2,3-dihydrothiophene-1,1-dioxide by reaction of 4-bromomethyl-2,3-dihydrothiophene-1,1-dioxide and ammonium O,O-diisopropyl phosphorodithioate.

4-(diisopropoxyphosphinylthio) methyl - 2,3 - dihydrothiophene-1,1-dioxide by reaction of 4-bromomethyl-2,3-dihydrophene-1,1-dioxide and ammonium O,O-diisopropyl phosphorothioate.

4-(isopropoxyisopropylphosphinothioylthio) methyl-2,3-dihydrothiophene-1,1-dioxide by reaction of 4-bromomethyl-2,3-dihydrothiophene-1,1-dioxide and ammonium O-isopropyl phosphorodithioate.

4-(isopropoxyisopropylphosphinylthio) methyl-2,3-dihydrothiophene-1,1-dioxide by reaction of 4-bromomethyl-2,3-dihydrothiophene-1,1-dioxide and ammonium O-isopropyl phosphorothioate.

3-(ethoxymethylphosphinylthio) methyl - 2,5 - dihydrothiophene-1,1-dioxide by reaction of 3-bromomethyl-2,5-dihydrothiophene-1,1-dioxide and ammonium O-ethyl methylphosphorothioate.

3-(diisobutoxyphosphinothioylthio) methyl - 2,5 - dihydrothiophene-1,1-dioxide by reaction of 3-bromomethyl-2,5-dihydrothiophene-1,1-dioxide and ammonium O,O-diisobutyl phosphorodithioate.

4-(diisobutoxyphosphinothioylthio) methyl - 2,3 - dihydrothiophene-1,1-dioxide by reaction of 4-bromomethyl-2,3-dihydrothiophene-1,1-dioxide and ammonium O,O-diisobutyl phosphorodithioate.

3-(isobutoxyisobutylphosphinylthio) methyl - 2,5 - dihydrothiophene-1,1-dioxide by reaction of 3-bromomethyl-2,5-dihydrothiophene-1,1-dioxide and ammonium O-isobutyl isobutylphosphorothioate.

4-(isobutoxyisobutylphosphinylthio) methyl - 2,3 - dihydrothiophene-1,1-dioxide by reaction of 4-bromomethyl-2,3-dihydrothiophene-1,1-dioxide and ammonium O-isobutyl isobutylphosphorothioate.

The compounds of this invention are useful as toxicants for combatting a wide variety of insect pests. It will be understood that the insects contemplated herein include not only those small invertebrate animals belonging mostly to the class Insecta, comprising six-legged, usually winged forms as flies, moths, beetles, bees and their immature forms, but also includes other allied classes of arthropods whose members are wingless and usually have more than six legs as mites, spiders and centipedes.

Although the compounds of the present invention are useful per se in combatting a wide variety of insect pests, it is preferred that the compounds be supplied to the pests or to the environment of the pest or pests in conjunction with a major proportion of a carrier which may be a solid, liquid or gaseous material, the invention compounds constituting the toxic ingredient of such compositions. The toxicant compounds may be employed either in the form of aqueous sprays or dust compositions and the amount of toxicant used in combatting the insect pests may vary considerably provided a sufficient quantity is used to provide the desired toxicity.

When employed in the form of a powder or dust for killing pests, the toxicant compounds may be mixed with a substantial portion of any suitable inert material or diluent, preferably in finely divided form, such as known grades of prepared paraciticide carrier clays, pyrophyllite, fuller's earth, bentonite, sulfur, lime, talc, whiting, diatomaceous earth, etc. Suitable dusts of this type usually contain not less than 0.5% and preferably not less than 5% by weight of toxicant.

Liquid pesticide sprays containing the toxicants of this invention may be prepared by first forming a solution of the compound in a suitable organic solvent, e.g., xylene, methylated naphthalenes, acetone, hexane, dioxane, methyl ethyl ketone, solvent naphtha or any highly aromatic petroleum type paraciticide oil, and preferably adding a small amount of emulsifying agent commonly employed in the art such as diglycol oleate, p-isooctyl phenyl ether of polyethylene glycol, sodium decylbenzene sulfonate and sodium dodecylbenzene sulfonate. The resulting concentrate solution, usually containing about 2 to 8 pounds of the toxicant per gallon, is incorporated with water in quantity sufficient to form an aqueous dispersion or emulsion having the desired active ingredient concentration.

In a preferred embodiment, acqueous spray dispersions may be formed by incorporating in water dry mixtures or so-called wettable spray powders containing the toxicants of the invention, generally in an amount of about 15 to 25 weight percent, based on the weight of the powder. These mixtures may also include inert diluents, suitable quantities of wetting and dispersing agents and, if desired, secondary toxicants.

The aqueous spray dispersions of the invention preferably should contain the active ingredient in an amount not less than ¼ of an ounce per 100 gallons of spray, the more usual concentration being in the range of ¼ to 2 pounds per 100 gallons of spray.

Many of the toxicant compounds of this invention are not only effective as contact and stomach toxicants but are also extremely toxic when used as systemic toxicants for killing pests which invade plants. In such use, the toxicant, with or without a suitable carrier or diluent, can be applied to soil in the vicinity of the growing plants to be protected, the toxicant being absorbed by the plants. Alternatively, the toxicant can be applied directly to portions of the plant where it is again absorbed and distributed throughout the plant tissue, including portions not directly treated. In either case, the whole plant then becomes toxic to pests which feed on it.

Following Table I contains the results of tests relating to use of representative toxicant compounds of the invention as contact pesticides.

TABLE I

| Toxicant Compound | Formulation | Mites [a] (percent kill) | Pea Aphids [b] (percent kill) | Mexican Bean Beetle Larvae [c] (percent kill) | Houseflies [d] (percent kill) |
|---|---|---|---|---|---|
| 1 | Toxicant composition [1] diluted in water.[2] | 100 | | 100 | |
| 3 | do | 100 | 100 | | |
| 4 | do | 100 | 100 | 100 | |
| 1 | Bait [3] containing 0.125% by weight of toxicant compound. | | | | [e] 100 |
| 2 | do | | | | [f] 91.2 |
| 3 | do | | | | [f] 100 |
| 4 | do | | | | [f] 97.8 |

[1] 4.8 grams of toxicant compound dissolved in acetone to 100 cc.
[2] In tests on toxicity to mites a formulation consisting of 1 part toxicant composition per 79 parts water was used, i.e., ½ pound toxicant per 100 gallons of water.
[3] The bait consists of powdered non-fat dry milk (44%), granulated sugar (44%) and powdered egg (12%).
[a] The mite tests were run on "red spider" (*Tetranychus telarius*) by spraying the indicated formulation onto horticultural (cranberry) bean plants infested with the mites. Following treatment, the plants were stored on racks on irrigated trays in a greenhouse. Observations on kill were made 3 days after treatment.
[b] The tests on toxicity to pea aphids (*Macrosiphum pisi*) were run by removing the pea aphids from infested broad bean plants, placing them on a wire screen and spraying them with the indicated formulation. Following treatment, the pea aphids were confined to untreated broad bean plants. Record of kill was made 3 days after treatment.
[c] The tests on toxicity to Mexican bean beetle larvae (*Epilachna varivestis*) were run by spraying horticultural (cranberry) bean plants with the indicated formulation and allowing the plants to dry. The larvae were confined to the treated foliage by means of wire cages. Record of kill was made 3 days after treatment.
[d] The tests on toxicity to houseflies (*Musca domestica*) were run by placing the formulations in emergence cages containing fly pupae. Cages containing bait untreated with the toxicant compound were used as checks. Examination of each cage was made after the indicated time to determine toxicity.
[e] Percent kill was recorded 9 days after confinement.
[f] Percent kill was recorded 8 days after confinement.

Following Table II illustrates systemic pesticide activity of some of the toxicant compounds coming within the scope of this invention. The tests were conducted by placing 100 cc. of the indicated formulation in a glass container along with the test plants (roots being washed free of soil). The plant foliage was infested with the pests 1 day later and mortality was noted 3 days after infestation.

TABLE II

| Toxicant Compound | Formulation | Mexican Bean Beetle Larvae [a] (percent kill) | Pea Aphids [b] (percent kill) | Southern Armyworm Larvae [a] (percent kill) | Mites [a] (percent kill) |
|---|---|---|---|---|---|
| 1 | 1 part toxicant composition [c] per 319 parts water. | 100 | 100 | 100 | 100 |
| 1 | 1 part toxicant composition [c] per 1,279 parts water. | 100 | 100 | | 100 |
| 2 | 1 part toxicant composition [c] per 159 parts water. | 80 | 100 | | 89.5 |
| 3 | do | 100 | 100 | | |
| 4 | do | 100 | 100 | 100 | 97.1 |

[a] The test plants were horticultural (cranberry) bean plants.
[b] Test plants were English broad bean plants.
[c] 4.8 grams of toxicant compound dissolved in acetone to 100 cc.

From the foregoing, it is apparent that we have discovered a series of novel and valuable compounds possessing outstanding value as pesticides.

We claim:

1. A compound having the structural formula:

$$\begin{array}{c} R_1O \\ \diagdown \\ R_2 \end{array} \!\!\!\! \begin{array}{c} Y \\ \| \\ P-S-CH_2-Q \end{array}$$

wherein Q is a cyclic sulfone radical selected from the class consisting of

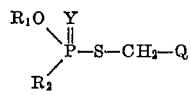 and

Y is a chalcogen selected from the group consisting of oxygen and sulfur, $R_1$ is an alkyl radical of 1 to 6 carbon atoms and $R_2$ is a member selected from the group consisting of alkyl and alkoxy radicals of 1 to 6 carbon atoms respectively.

2. A compound in accordance with claim 1 wherein $R_2$ is an alkoxy radical of 1 to 6 carbon atoms.

3. The compound in accordance with claim 2 wherein Q is the radical

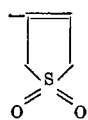

Y is sulfur, $R_1$ is ethyl and $R_2$ is ethoxy.

4. The compound in accordance with claim 2 wherein Q is the radical

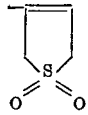

Y is sulfur, $R_1$ is methyl and $R_2$ is methoxy.

5. The compound in accordance with claim 2 wherein Q is the radical

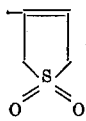

Y is oxygen, $R_1$ is ethyl and $R_2$ is ethoxy.

6. A compound in accordance with claim 1 where $R_2$ is an alkyl radical of 1 to 6 carbon atoms.

7. The compound in accordance with claim 6 wherein Q is the radical

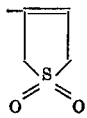

Y is sulfur, $R_1$ is ethyl and $R_2$ is methyl.

References Cited

UNITED STATES PATENTS 3,106,565  10/1963  Newallis _____ 260—332.1
3,151,147   9/1964  Phillips et al. _____ 260—461

FOREIGN PATENTS 687,363  5/1964  Canada.

HENRY R. JILES, Primary Examiner
C. M. SHURKO, Assistant Examiner

U.S. Cl. X.R.

424—202